(12) United States Patent
Chreptyk et al.

(10) Patent No.: US 12,246,718 B2
(45) Date of Patent: Mar. 11, 2025

(54) ENCODING JUNCTION INFORMATION IN MAP DATA

(71) Applicant: NVIDIA Corporation, Santa Clara, CA (US)

(72) Inventors: Russell Chreptyk, Seattle, WA (US); Matthew Ashman, Redmond, WA (US); Andy Campbell, Kirkland, WA (US); Tharun Battula, Redmond, WA (US); Vaibhav Thukral, Bellevue, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 363 days.

(21) Appl. No.: 17/807,474

(22) Filed: Jun. 17, 2022

(65) Prior Publication Data

US 2023/0406315 A1    Dec. 21, 2023

(51) Int. Cl.
*G01C 21/00* (2006.01)
*B60W 30/18* (2012.01)
*G08G 1/056* (2006.01)
*B60W 60/00* (2020.01)

(52) U.S. Cl.
CPC ............ *B60W 30/18159* (2020.02); *G01C 21/3815* (2020.08); *G08G 1/056* (2013.01); *B60W 60/0011* (2020.02); *B60W 2552/05* (2020.02); *B60W 2552/53* (2020.02); *B60W 2554/4044* (2020.02); *B60W 2555/60* (2020.02); *B60W 2556/40* (2020.02)

(58) Field of Classification Search
CPC ....... B60W 30/18159; B60W 60/0011; B60W 2552/05; B60W 2552/53; B60W 2554/4044; B60W 2555/60; B60W 2556/40; G01C 21/3815; G01C 21/3841; G01C 21/00; G08G 1/056
USPC .......................................................... 701/25
See application file for complete search history.

(56) References Cited

U.S. PATENT DOCUMENTS

| | | | |
|---|---|---|---|
| 11,604,079 B1* | 3/2023 | Karamete | G01S 19/50 |
| 2013/0266175 A1* | 10/2013 | Zhang | G06V 10/457 |
| | | | 382/103 |
| 2015/0285656 A1* | 10/2015 | Verheyen | G08G 1/0129 |
| | | | 701/428 |
| 2016/0146617 A1* | 5/2016 | MacFarlane | G01C 21/3815 |
| | | | 701/532 |
| 2020/0174481 A1* | 6/2020 | Van Heukelom | G01C 21/3407 |
| 2020/0208992 A1* | 7/2020 | Fowe | G01C 21/3811 |

* cited by examiner

*Primary Examiner* — Shardul D Patel
(74) *Attorney, Agent, or Firm* — Maschoff Brennan

(57) ABSTRACT

Embodiments of the present disclosure relate to encoding of junction area information in map data. In particular, the encoding may include organizing vehicle paths that traverse through a junction area according to path groups and organizing contentions that influence behavior of vehicles traveling along the vehicle paths according to contention groups. In addition, the encoding may include generating direction data structures that associate respective path groups with one or more of the contention groups. In these or other embodiments, the map data that corresponds to the junction area may be updated with direction data structures.

20 Claims, 12 Drawing Sheets

ENCODING JUNCTION INFORMATION IN MAP DATA

BACKGROUND

Autonomous vehicles (e.g., vehicles that perform self-driving operations) often use map data (e.g., high definition (HD) map data with a precision level within 2-30 cm) that represents a region to navigate within that region. The map data may include spatial geometric information about the areas in or through which the autonomous vehicles may travel. Further, the map data may include semantic information that provides additional information about the areas and elements in the areas such as element types, element descriptors, driving rules associated with certain elements or areas, etc. In some instances, the semantic information may relate to junction areas within the region that correspond to potential yield scenarios of vehicles passing through the junction areas.

In these or other instances, the semantic information may be used by autonomous vehicles to help with navigating within the region. For example, semantic information related to junction areas may help inform autonomous vehicles in negotiating various yield scenarios that may be encountered at the junction areas.

SUMMARY

Embodiments of the present disclosure relate to encoding of junction area information in map data. In particular, the encoding may include organizing vehicle paths that traverse through a junction area (e.g., navigation areas that have potential yield scenarios) according to path groups and organizing contentions (e.g., areas that may trigger yield scenarios) that influence the behavior of vehicles traveling along the vehicle paths according to contention groups. In addition, the encoding may include generating direction data structures that are data structures configured to associate respective path groups with one or more of the contention groups. In these or other embodiments, the map data that corresponds to the junction area may be updated with direction data structures.

BRIEF DESCRIPTION OF THE DRAWINGS

The present systems and methods for yield scenario encoding for autonomous systems are described in detail below with reference to the attached drawing figures, wherein.

DETAILED DESCRIPTION

Figure 1:
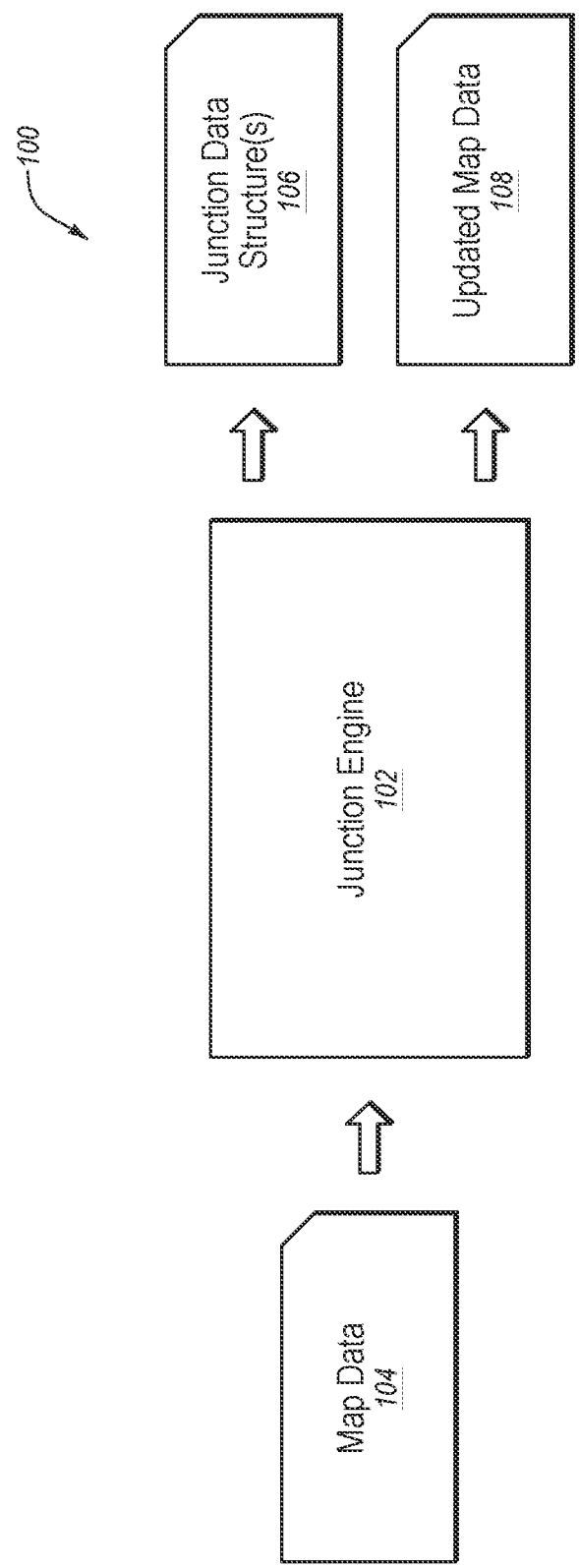
FIG. 1 illustrates an example junction engine configured to generate one or more junction data structures, in accordance with some embodiments of the present disclosure.

Vehicles often encounter yield scenarios in which moving and/or non-moving obstacles (e.g., other vehicles, pedestrians, bicyclists, lane barriers, and the like) may be disposed along a travelling route of the vehicles. Additionally, the yield scenarios may be associated with certain rules, laws, or protocols (generally referred to as "contention rules") with respect to how the vehicles should behave when encountering certain yield scenarios. For example, in some yield scenarios, a vehicle may have the right of way as compared to a contending object according to applicable contention rules. In other yield scenarios, the vehicle may be expected to yield to a contending object. Such yield scenarios may exist at (controlled and un-controlled) intersections, crosswalks, merging lanes, highway (or interstate) on/off ramps, traffic circles, driveway intersections, and the like such as navigating parking structures and/or lots. In the present disclosure, areas that correspond to any potential yield scenarios may be referred to as junction areas or junctions.

In addition, map data (e.g., high definition (HD) map data with a precision level within 2-30 cm) that represents geographical regions may include junction data that is associated with junction areas. In general, the map data may include spatial geometric information about the corresponding geographical regions. Additionally or alternatively, the map data may include semantic information that provides additional information about the corresponding geographical regions and elements in the corresponding geographical regions such as element types, element descriptors, driving rules associated with certain elements or areas, etc.

In some instances, map data and the semantic information included therein may be used by vehicles in making self-maneuvering operations. For example, a control agent that dictates the maneuvering of an autonomous vehicle may use the map data and the semantic information included therein to identify routes and paths as well as objects and yield scenarios that may be encountered while navigating in a particular area. In these or other embodiments, the control agent may use the map data and the corresponding semantic information to determine how to negotiate yield scenarios that may be encountered.

According to one or more embodiments of the present disclosure, map data associated with junction areas ("junction data") may be encoded with respective junction data structures to improve the semantic information of the map data. For example, according to one or more embodiments, respective junction data structures may be generated for a corresponding junction area. The respective junction data structures may include one or more direction data structures that each include a respective group of paths ("path group") that traverse through the corresponding junction. One or more of the direction data structures may also respectively include one or more groups of contentions ("contention group") in which each contention group relates to a yield scenario that may be encountered by a vehicle traveling along one of the paths of the corresponding path group. In these or other embodiments, one or more of the direction data structures may respectively include one or more direction rules. The direction rules may include contention rules that dictate vehicle wait behavior as related to the path group of the corresponding data structure and that may be triggered by the contentions of the contention groups.

Therefore, the junction data structures may indicate the potential yield scenarios that may be encountered at the corresponding junction areas. In these or other embodiments, the junction data structures may also accordingly include corresponding direction rules that indicate vehicle behavior with respect to the potential yield scenarios of the corresponding junction area. The encoding of the map data with the junction data structures in the manner disclosed in the present disclosure accordingly may also improve the map data by improving the semantic information included in the map data.

For example, in one or more embodiments, the grouping of the vehicle paths and the contention groups and corresponding associating with corresponding direction rules allows for simplification of providing semantic information with respect to the many different yield scenarios that may be present in junction areas. For instance, rather than having to individually define and associate contention rules for each and every path within junction areas and each and every contention that corresponds to every individual path, the direction data structures provide the defining and associating on a group basis based on similarities between the elements in each group (as discussed in further detail below). Such data structures that are based on groupings accordingly may be used to add useful information to map data while also reducing computing resources (e.g., processing and/or memory resources). Further, in some instances, the framework of the junction data structures and corresponding direction data structures may be used to dictate a visual rendering of the junction areas in which path groups and contentions that correspond to the different path groups may be represented together. The presentation in such a manner helps with the identification of different potential yield scenarios at the junction areas as well as inspection and editing of logical details (e.g., details on how to negotiate the different yield scenarios) of the map data associated with the junction areas. The improved ability to inspect and edit accordingly improves the map data itself (e.g., the semantic information related to yield scenarios). Additionally, the improvement in the map data may also accordingly improve self-maneuvering operations performed by vehicles that use the map data (e.g., improves the ability of vehicles to autonomously and safely negotiate yield scenarios).

Although the present disclosure may be described with respect to vehicles in general or an example autonomous vehicle 500 (alternatively referred to herein as the "vehicle 500" or the "ego-vehicle 500," an example of which is described with respect to FIGS. 5A-5D), this is not intended to be limiting. For example, the systems and methods described herein may be used by or with respect to any number of objects, for example but without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to controlling an autonomous vehicle for negotiating a yield scenario, this is not intended to be limiting, and the systems and methods described herein may be used in augmented reality, virtual reality, mixed reality, robotics, security and surveillance, autonomous or semi-autonomous machine applications, and/or any other technology spaces where autonomous control systems may be used. Further, reference in the present disclosure to an "autonomous vehicle" includes any vehicle that has the capability to perform some sort of maneuvering operation (e.g., turning, braking, accelerating, etc.) without direct control by an operator. As such, reference to "autonomous vehicles" is not limited to fully autonomous vehicles.

In addition, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example junction engine 102 configured to generate one or more junction data structures 106 based on map data 104. The junction engine 102 may be implemented according to one or more embodiments of the present disclosure.

The map data 104 may include High-Definition (HD) map data in some embodiments. HD map data may include data representing one or more geographical areas with a relatively high level of precision and resolution (e.g., a precision level within 2-50 cm). The map data 104 may include traditional information related to the corresponding geographical areas such as roads, geographical features, buildings, etc. In these or other embodiments, the map data 104 may include information describing driving lanes including spatial locations of lanes and semantic information about each lane. The spatial location of a respective lane may include the geometric location in latitude, longitude and/or the elevation of the respective lane, with a relatively high precision, for example, at or below 50 cm precision. The semantic information of a respective lane may include lane restrictions such as direction of travel of the respective lane, speed restrictions associated with the respective lane, type of lane (for example, a lane for going straight, a left turn lane, a right turn lane, an exit lane, and the like), restrictions on crossing to the left, connectivity to other lanes and so on.

In these or other embodiments, the map data 104 may include semantic information describing stop lines, yield lines, spatial locations of crosswalks and/or driveways, safely navigable space, spatial locations of speed bumps, curbs. In these or other embodiments, the semantic information of the map data 104 may describe road signs including spatial locations of the road signs and type of signage that may be relevant to driving restrictions. Examples of road signs described by the map data 104 may include stop signs, traffic lights, speed limit signs, one-way signs, do-not-enter signs, yield signs (vehicle, pedestrian, animal), and so on.

In some embodiments, the map data 104 may include junction data related to junction areas of the respective geographical regions. As indicated above, the junction areas may include any area that may correspond to a potential yield scenario that may be encountered by a vehicle traversing the corresponding area.

The junction engine 102 may include code and routines configured to enable a computing system to perform one or more operations. Additionally or alternatively, the junction engine 102 may be implemented using hardware including a processor, a microprocessor (e.g., to perform or control performance of one or more operations), a field-programmable gate array (FPGA), or an application-specific integrated circuit (ASIC). In some other instances, the junction engine 102 may be implemented using a combination of hardware and software. In the present disclosure, operations described as being performed by the junction engine 102 may include operations that the junction engine 102 may direct a corresponding system to perform.

In some embodiments, the junction engine 102 may be configured to generate one or more junction data structures 106 based on the map data 104. In some embodiments, a respective junction data structure 106 may include semantic information regarding the potential yield scenarios that may be encountered at a corresponding junction area. In these or other embodiments, the respective junction data structure 106 may include semantic information regarding wait behaviors that may be associated with the potential yield scenarios. In some embodiments, the junction engine 102 may be configured to generate the junction data structures 106 according to one or more operations of a process 200 described in further detail below with respect to FIG. 2.

In these or other embodiments, the junction engine 102 may be configured to generate updated map data 108 based on the map data 104 and the junction data structures 106. For example, in some embodiments, to generate the updated map data 108, the junction engine 102 may be configured to encode junction data of the map data 104 that is associated with one or more junction areas with respective junction data structures 106 that correspond to the respective junction areas. The updated map data 108 may accordingly include augmented semantic information related to the junction areas.

Modifications, additions, or omissions may be made to FIG. 1 without departing from the scope of the present disclosure. For example in some embodiments, the map data 104 may correspond to any sort of region or area such as, for example, the inside of a building, a campus, or any other area, and is not limited to strictly geographical regions.

Figure 2A:
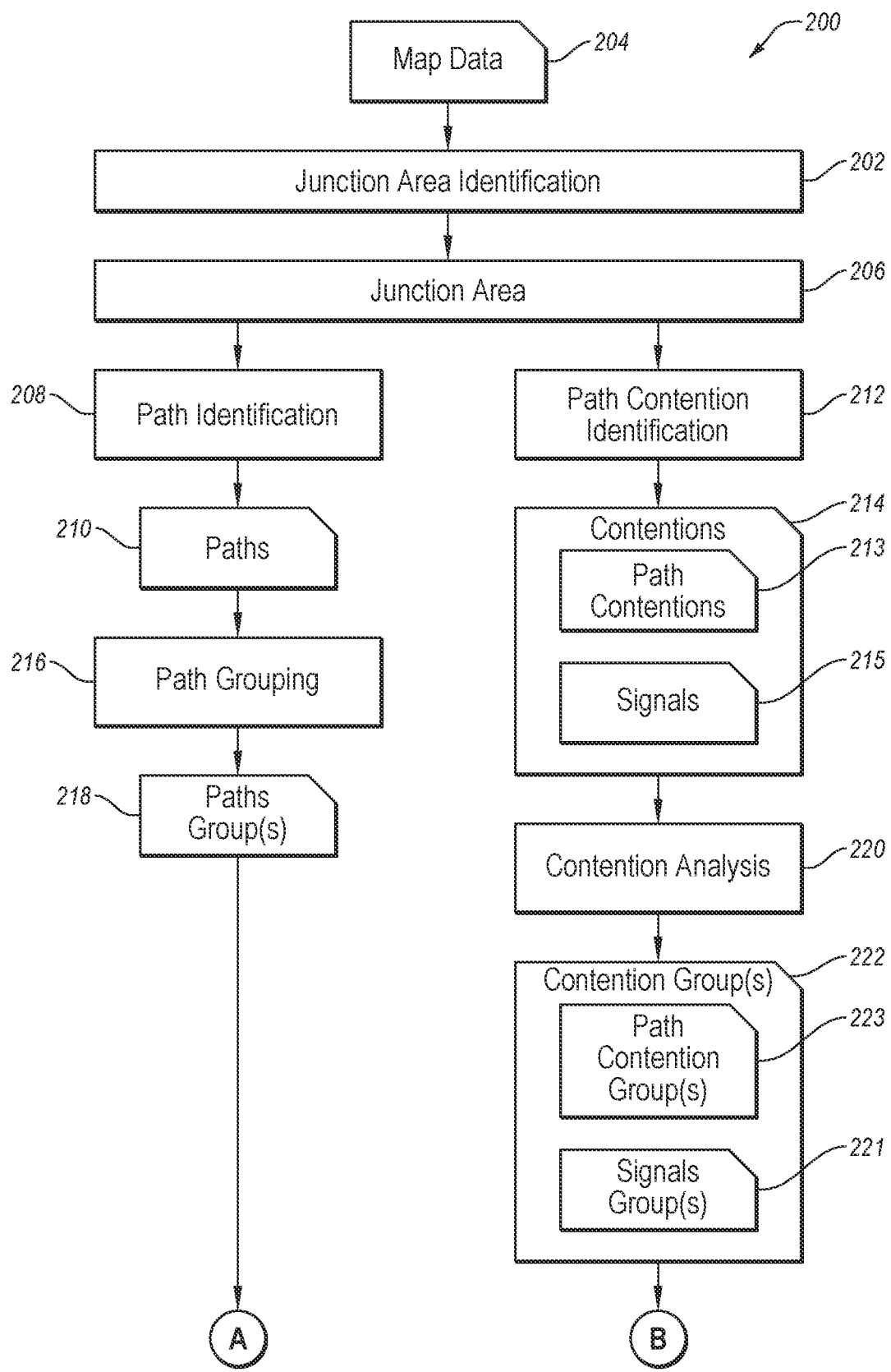
FIGS. 2A and 2B illustrate an example process related to generating a junction data structure, in accordance with some embodiments of the present disclosure.
Figure 2B:
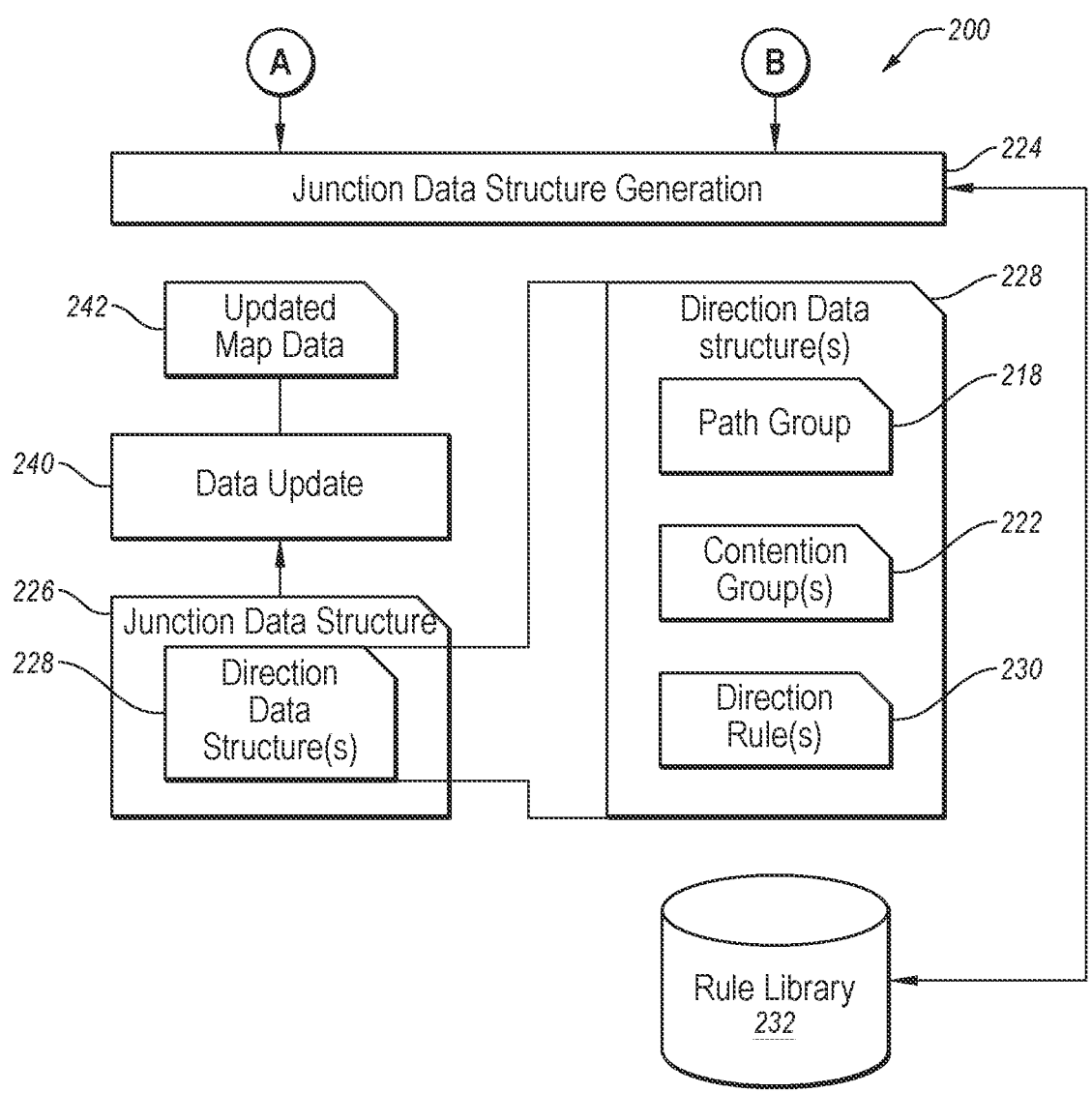

FIGS. 2A and 2B illustrate an example process 200 related to generating a junction data structure 226, according to one or more embodiments of the present disclosure. The process 200 may be performed by any suitable system, apparatus, or device using any combination of hardware, firmware, and/or software. For instance, various operations may be carried out by one or more processors executing instructions stored in memory. The operations of the process 200 may also be embodied as computer-usable instructions stored on computer storage media. Additionally or alternatively, one or more of the operations of the process 200 may be provided by a standalone application, a service or hosted service (standalone or in combination with another hosted service), or a plug-in to another product, to name a few. By way of example, in some embodiments, one or more operations of the process 200 may be performed by the junction engine 102 described with respect to FIG. 1. In these or other embodiments, one or more operations may be performed by a computing system, such as a computing system 600 described in further detail below with respect to FIG. 6.

In some embodiments, the process 200 may include junction area identification 202. The junction area identification 202 may include identifying a junction area 206 of a region based on map data 204, which may be analogous to the map data 104 of FIG. 1. For example, the junction engine 102 may be configured to identify areas of the region over which a vehicle may navigate, such as roads and/or corresponding lanes (referred to generally as "navigation routes"). In some embodiments, the junction engine 102 may identify the navigation routes based on corresponding semantic data included in the map data 204.

In these or other embodiments, the junction engine 102 may be configured to identify, as the junction area 206, one or more areas that may intersect with a navigation route and that may present a potential yield scenario with respect to traversing a navigation route. For example, the junction engine 102 may identify intersections, merging lanes, crosswalks, driveways that intersect with navigation paths, etc. to identify the junction area 206. In some embodiments, the junction engine 102 may be configured to identify the junction area 206 using the semantic information included in the map data 204 in order to identify elements that may present potential yield scenarios. In these or other embodiments, the junction engine 102 may be configured to identify the junction area 206 based on user input.

Additionally or alternatively, in some embodiments, the junction area 206 may be defined using a bounding volume that may surround the features of the junction area 206. For example, the bounding volume may surround all of the features of the junction area 206 including traffic lights and/or signs, crosswalks, railroad crossings, driveway intersections, lane merges, etc. of the junction area 206. Additionally or alternatively, the borders of the bounding volume may be such that navigation lanes entering and/or exiting the junction area 206 may be respectively sliced by a border of the bounding volume. The bounding volume may be any suitable two-dimensional or three-dimensional shape that may be used to define the junction area 206. For example, in some embodiments, the bounding volume may be a convex polygon. In these or other embodiments, the edges of the polygon may be the borders.

In some embodiments, identifying the junction area 206 may include obtaining (e.g., generating) junction area data structures that include information about the junction area 206. Further, in the present disclosure, general reference to the "junction area 206" may also include reference to the information about the junction area 206 and/or the corresponding junction area data structure. An example of the junction area data structure is given in further detail below with respect to FIG. 3.

Figure 2C:
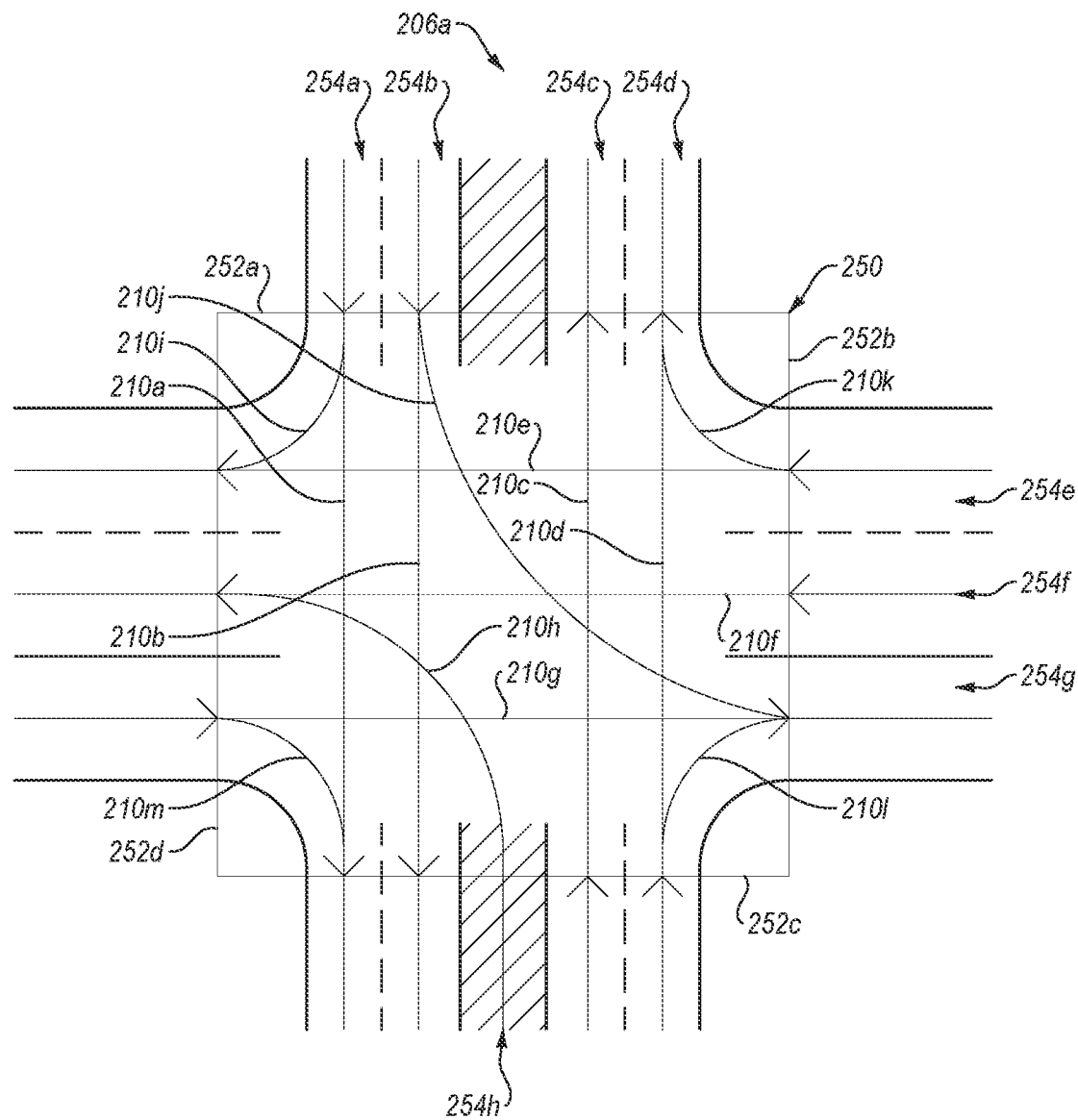
FIG. 2C illustrates an example junction area, in accordance with some embodiments of the present disclosure.

By way of example, FIG. 2C illustrates an example junction area 206a according to one or more embodiments of the present disclosure. The junction area 206a may correspond to an intersection and may be defined by a rectangular polygon 250. The intersection of the junction area 206a may include a first lane 254a, a second lane 254b, a third lane 254c, a fourth lane 254d, a fifth lane 254e, a sixth lane 254f, a seventh lane 254g, and an eight lane 254h. The respective directionalities of the lanes 254 are indicated by the respective arrows disposed in the lanes 254 outside of the polygon 250.

The polygon 250 may include a first edge 252a, a second edge 252b, a third edge 252c, and a fourth edge 252d. Each edge 252 may intersect with one or more of the lanes 254 such that the edges 252 may slice the lanes 254 in the manner illustrated in FIG. 2C.

Returning to FIG. 2A, in some embodiments, the process 200 may include path identification 208. The path identification 208 may include identifying potential paths 210 that may be taken through the junction area 206. For example, in some embodiments, the junction engine 102 may be configured to identify the paths 210 based on connections between lane entry points and exit points in the junction area 206. In addition, the paths 210 may be identified based on rules that may be associated with the corresponding lanes. In some embodiments, the entry points and exit points may correspond to the borders of a bounding volume that defines the junction area 206.

For example, referring back to FIG. 2C, the edge 252a of the polygon 250 may be an entry point of the lanes 254a and 254b and may be an exit point of the lanes 254c and 254d. In addition, the edge 252b may be an entry point of the lanes 254e and 254f, and may be an exit point of the lane 254g. Similarly, the edge 252c may be an entry point for the lanes 254c, 254d, and 254h, and may be an exit point for lanes 254a and 254b. In addition, the edge 252d may be an entry point for the lane 254g and may be an exit point for the lanes 234e and 234f.

In addition, a first path 210a may be identified between the edge 252a and the edge 252c based on the edge 252a being an entry point for the lane 254a and the edge 252c being an exit point for the lane 254a. Similarly, a second path 210b may be identified between the edge 252a and the edge 252c based on the edge 252a being an entry point for the lane 254b and the edge 252c being an exit point for the lane 254b. In addition, a third path 210c may be identified between the edge 252a and the edge 252a based on the edge 252a being an exit point for the lane 254c and the edge 252c being an entry point for the lane 254c. Paths 210e, 210f, and 210g may be identified in a similar manner based on the respective entry and exit points of lanes 254e, 254f, and 254g.

Further, in some embodiments, one or more of the paths 210 may relate to possible maneuvers that may result in moving from one lane to another. For example, a right turn may be permitted from lane 254a to lane 254e, or from lane 254e to lane 254d, or from lane 2542c to 254g, or from lane 254g to lane 254a. Accordingly, a path 210i that relates to a right turn from lane 254a into lane 254e may be identified based on the edge 252a being an entry point for the lane 254a, based on the edge 252d being an exit point for the lane 254e, and based on the right turn permissibility from lane 254a to lane 254e. Illustrated right turn paths 210k, 210l, and 210m may be similarly identified. In addition, illustrated left turn paths 210j and 210h related to left turns from lanes 254b and 254h, respectively, may also be identified in a similar manner.

Returning to FIG. 2A, in some embodiments, identification of the paths 210 may include obtaining (e.g., receiving or generating) path data structures that respectively include information about the paths 210. Further, in the present disclosure, general reference to the "paths 210" may also include reference to the information about the paths 210 and/or the corresponding path data structures. An example of the path data structures is given in further detail below with respect to FIG. 3.

In some embodiments, the process 200 may include a contention identification 212 that may include identification of contentions 214 of the junction area 206. The contentions 214 may include any area of the junction area 206 that may influence vehicle wait behavior with respect to potential yield scenarios. The influence of vehicle wait behavior may include the potential presence of another object in a path that may create a yield scenario (e.g., intersecting paths, merging paths, a pedestrian area (e.g., a crosswalk, a sidewalk, etc.), a driveway area, a railroad crossing, etc.). The contentions that may create a potential yield scenario may be referred to generally as "path contentions 213." Some example path contentions 213 may include intersecting paths, merging paths, a pedestrian area (e.g., a crosswalk, a sidewalk, etc.), a driveway area, a railroad crossing, etc.

Additionally or alternatively, the influence of wait behavior may include laws, regulations, driving norms, etc., that may dictate wait behavior with respect to the yield scenarios. As such, in some embodiments, the contentions 214 may also include signals 215 that may indicate a specific wait behavior with respect to corresponding yield scenarios. For example, the signals 215 may include traffic signals, such as traffic lights, stop signs, yield signs, railroad crossing signs, railroad crossing gates, etc. In these or other embodiments, multiple signals 215 may correspond to a same physical object. For example, a traffic light may have a green light, a red light, a yellow light, turn lights, etc. Each light state may correspond to different wait behavior and accordingly may be considered a different signal 215. Therefore, in the present disclosure, reference to a "signal 215" in the context of being a contention 214 may include individual light states of a traffic light.

In some embodiments, identification of the contentions 214 may include obtaining (e.g., receiving or generating) contention data structures that respectively include information about the contentions 210. Further, in the present disclosure, general reference to the "contentions 214" may also include reference to the information about the contentions 214 and/or the corresponding contention data structures. One or more examples of the contention data structures are given in further detail below with respect to FIG. 3.

In some embodiments, the process 200 may include a path grouping 216 that may include identifying one or more groups of paths ("path groups 218"). Although the term "group" is used, each path group 218 may include a single path 210 or multiple paths 210. In some embodiments, the path grouping 216 may organize the paths 210 into the path groups 218 according to shared yield scenarios (e.g., as caused by the same or similar contentions 214) by the paths 210.

In these or other embodiments, an indication as to whether a particular path 210 may have the same or similar yield scenarios as another path 210 may be based on whether the paths 210 relate to a same maneuver through the junction area 206 in a common direction. A maneuver may include a series of one or more actions that may be performed by a vehicle to pass through the junction area 206. For example, a maneuver may include passing straight through the junction area 206, turning right, turning left, merging with another path 210, etc. In these or other embodiments, a determination as to which paths 210 may have the same maneuver in a common direction may be based on whether the paths 210 have the same entry point into the junction area 206 and have the same exit point out of the junction area 206. As such, in some embodiments, the paths 210 may be grouped according to having shared entry and exit points of the junction area 206. In some embodiments, the path grouping 216 may also include annotating information related to the path groups 218 with information related to directionality of the maneuvers associated with the respective path groups 218.

By way of example, returning to FIG. 2C, the paths 254 may be grouped according to shared entry and exit points (e.g., as indicated by having the same edge 252 of the polygon 250 be the same entry point and also having the same edge 252 of the polygon 250 be the same exit point). For instance, the paths 210a and 210b may be grouped into a first path group based on the edge 252a being the entry point for both paths 210a and 210b and based on the edge 252c being the exit point for both paths 210a and 210b. Paths 210c and 210d may be grouped into a second path group and paths 210e and 210f may be grouped into a third path group based on a similar analysis.

In these and other embodiments, the paths 210h, 210i, 210j, 210k, 210l, and 210m may individually be indicated as being their own respective path group of only one path. In particular, the paths 210h, 210i, 210j, 210k, 210l, and 210m may relate to a respective turning maneuver in which the directionality for each respective turning maneuver of each of the paths 210h, 210i, 210j, 210k, 210l, and 210m through the junction area 206a is different. Such differences in the maneuvers is indicated in that none of the paths 210h, 210i, 210j, 210k, 210l, and 210m has the same set of entry and exit points as any other paths 210 of the junction area 206.

Returning to FIG. 2A, in some embodiments, identification of the path groups 218 may include obtaining (e.g., receiving or generating) path group data structures that respectively include information about the path groups 218. Further, in the present disclosure, general reference to the "path groups 218" may also include reference to the information about the path groups 218 and/or the corresponding path group data structures. One or more examples of the path group data structures are given in further detail below with respect to FIG. 3.

In some embodiments, the process 200 may include a contentions analysis 220. The contention analysis 220 may include analyzing the contentions 214 to organize the contentions 214 into one or more contention groups 222. Although the term "group" is used, each contention group 222 may include a single contention 214 or multiple contentions 214. In some embodiments, the contention analysis 220 may include organizing the contentions 214 based on vehicle wait behavior that may be influenced by the path contentions 214.

For example, in some embodiments, the contentions 214 may be initially classified based on whether the contentions 214 create yield scenarios or whether the contentions 214 are elements that indicate wait behaviors (e.g., traffic signals) related to yield scenarios. For example, in some embodiments, the contentions 214 may be initially classified based on whether the contentions 214 are path contentions 213 or signals 215.

In these or other embodiments, the signals 215 may be classified into signal groups 223 according to their respective directionalities with respect to the junction area 206. Signal directionality may relate to which traveling directions may be influenced by the corresponding signals 215. For example, signal directionality may be based the direction that a traffic light, stop sign, or yield sign may be facing. Such directionality may be determined by determining a normal of a face of the signal 215 and a bounding volume border that intersects with such normal.

Additionally or alternatively, the signals 215 may be grouped according to the wait behaviors that are dictated by the corresponding traffic signals. For example, traffic signals that dictate the same type of wait behavior may be grouped together.

In these or other embodiments, the signal groups 221 may be organized based on a combination of signal directionality and wait behavior corresponding to the signals 215. For instance, the signals 215 may first be grouped according to directionality and then those signal groups 221 may be classified into corresponding sub-groups according to corresponding wait behaviors.

In these or other embodiments, the path contentions 213 that create potential yield scenarios may also be grouped into path contention groups 223 according to the types of yield scenarios and wait behaviors that may correspond to such path contentions 213. For instance, path contentions 213 that relate to merging paths may have different wait behaviors than those that relate to intersecting paths, which may be different from those that relate to oncoming traffic, pedestrian areas, railroad crossings, or driveway areas. Therefore, in some embodiments, the path contention groups 223 may be initially organized according to path contention types.

In these or other embodiments, the organizing of the path contentions 213 into the path contention groups 223 may be based on which paths 210 or path groups 218 may correspond to which path contentions 213. For example, all the path contentions 213 that correspond to a same path group 218 may be organized into a same path contention group 223. Additionally or alternatively, all the path contentions 213 that are shared between two or more path groups 218 may be organized into a same path contention group 223.

In these or other embodiments, the path contention groups 223 may be organized based on a combination of shared paths 210 or path groups 218 and path contention types. For instance, the path contentions 213 may first be grouped according to shared paths or path groups and then those path contention groups 223 may be classified into corresponding sub-groups according to corresponding path contention type.

In some embodiments, identification of the contention groups 222 may include obtaining (e.g., receiving or generating) contention group data structures that respectively include information about the contention groups 222. Further, in the present disclosure, general reference to the "contention groups 222" may also include reference to the information about the contention groups 222 and/or the corresponding contention group data structures. One or more examples of the contention group data structures are given in further detail below with respect to FIG. 3.

In some embodiments, the process 200 may include junction data structure generation 224. The junction data structure generation 224 may include the generation of a junction data structure 226 that corresponds to the junction area 206. The junction data structure 226 may be an example of the junction data structures 106 of FIG. 1. In these or other embodiments, the junction data structure 226 may include indications of the paths 210, path groups 218, contentions 214 and contention groups 222 that may be associated with the junction area 206. Additionally or alternatively, the junction data structure 226 may indicate associations between the contention groups 222 and the path groups 218. The associations may indicate which of the contention groups 222 may influence vehicle behavior with respect to which of the path groups 218. In these or other embodiments, the associations may also indicate the wait behavior that may apply to the respective path groups with respect to the contention groups respectively associated therewith.

For example, in some embodiments, the junction data structure 226 may include one or more direction data structures 228. In these or other embodiments, a respective direction data structure 228 may correspond to a respective path group 218. Additionally or alternatively, a respective direction data structure 228 may indicate which contention groups 222 may be associated with the respective path group 218 of the respective direction data structure 228. In these or other embodiments, a respective direction data structure 228 may include one or more direction rules 230. In general, the direction rules 230 may indicate a set of conditions that may be evaluated to determine the vehicle wait behaviors that should be performed by vehicles traversing respective paths 210 of the corresponding path group 218 with respect to yield scenarios that correspond to the contention groups 222 that are associated with the respective paths 210 of the corresponding path group 218.

In some embodiments, the junction data structure generation 224 may include obtaining direction rules 230 for the different direction data structures 228. In these or other embodiments, the direction rules 230 may be obtained based on relationships between characteristics of the respective path groups 218 and their associated contention groups 222. For example, in some embodiments, the direction rules 230 may be identified using a pattern-based technique that associates contention rules that correspond to certain contentions 214 with certain path archetypes of the paths 210 of the corresponding path groups 218.

For instance, in some embodiments a rule library 232 may include contention rules that are associated with corresponding contentions and that indicate wait behaviors with respect to the yield scenarios associated with the corresponding contentions. Additionally, the contention rules and associated contentions included in the rule library 232 may be associated with respective types of path maneuvers to which the contention rules may apply. For example, in some embodiments, the rule library 232 may be configured as a look up table that indicates the corresponding associations.

In these or other embodiments, by way of example, particular direction rules 230 for a particular direction data structure 228 may accordingly be identified by accessing the rule library 232 and obtaining the contention rules included therein that are associated with particular contentions 214 of a particular contention group 222 of the particular direction data structure 228. The particular contention rules may also be associated in the rule library 232 with a particular path maneuver that corresponds to the particular path group 218 of the particular direction data structure 228. In these or other embodiments, the particular contention rules that correspond to the particular contention group as applied with respect to the particular path maneuver of the particular path group may be obtained as the particular direction rules 230.

In some instances, accessing the rule library 232 may not result in obtaining a corresponding direction rule 230 (e.g., the rule library 232 may not have a matching pattern). In some embodiments, obtaining the corresponding direction rule 230 may include obtaining input (e.g., user input) that may include information that may be used to define the corresponding direction rule.

As another example, in some embodiments, the direction rules 230 may be identified using any suitable neural network rather than or in addition to using the rule library 232. For instance, the neural network may be trained with training data that indicates which wait behaviors may be followed depending on certain contentions and contention types and with respect to certain path archetypes (e.g., certain path directionalities, path types, etc.). In these or other embodiments, the contention groups that correspond to a particular path group and the related association may be provided as input to the neural network, which may output applicable direction rules 230.

In some embodiments, obtaining of the direction rules 230 may include obtaining direction rule data structures that respectively include information about the direction rules 230. Further, in the present disclosure, general reference to the "direction rules 230" may also include reference to the information about the direction rules 230 and/or the corresponding direction rule data structures. One or more examples of the direction rule data structures are given in further detail below with respect to FIG. 3.

In some embodiments, the direction data structures 228 may indicate the associations between their respective path groups 218 and the corresponding contention groups 222 and direction rules 230 by including the corresponding data structures of the respective path groups 218 and the corresponding contention groups 222 and direction rules 230 as part of the respective direction data structures 228. The associations of the direction data structures 228 of the junction data structure 226 may thus indicate the respective wait behaviors that may apply to the different paths of the junction area 206.

In some embodiments, the process 200 may include a data update 240. The data update 240 may include updating data with the junction data structure 226. For example, in some embodiments, the map data 204 may be updated to include the junction data structure 226 to generate updated map data 242. In these or other embodiments, the updating of the map data 204 may include augmenting portions of the map data 204 that are associated with the junction area 206 with the junction data structure 226.

In some embodiments, the data update 240 may also include exporting the updated map data 242 to map data that may be stored on a vehicle (e.g., the HD map 522 stored on a vehicle 500 described below with respect to FIG. 5C). In these or other embodiments, the vehicle may use the updated map data 242 to perform one or more navigation operations and/or determinations. For example, the vehicle may use the information in the junction data structure 226 to determine its wait behavior with respect to the junction area 206. In some embodiments, the exporting of the updated map data 242 may include translating the information from the junction data structure 226 into wait geometry data, such as the wait geometry data discussed in U.S. patent application Ser. No. 17/512,495 filed on Oct. 27, 2021 and incorporated by reference in the present disclosure in its entirety.

In some embodiments, the data update 240 may include updating the rule library 232. For example, as indicated above, in some instances, one or more direction rules 230 may be associated with certain contention rules and path archetypes that were not found in the rule library 232. In some embodiments, the rule library 232 may be updated to include the associations with such direction rules 230 such that the rule library 232 may be improved upon.

In these or other embodiments, the data update 240 may include training a neural network with associations that may correspond to one or more of the direction rules 230. Additionally or alternatively, the data update 240 may include a validation process that may be used to validate the junction data structure 226. The validation may be used to identify and correct errors.

The process 200 of FIGS. 2A and 2B may accordingly be used to generate the junction data structure 226, which may include semantic information regarding wait behaviors that may be associated with the potential yield scenarios of the junction area 206. Further, the process 200 may be used to improve upon the map data 204 and the ability to perform navigation using the map data 204.

Modifications, additions, or omissions may be made to the process 200 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 3:
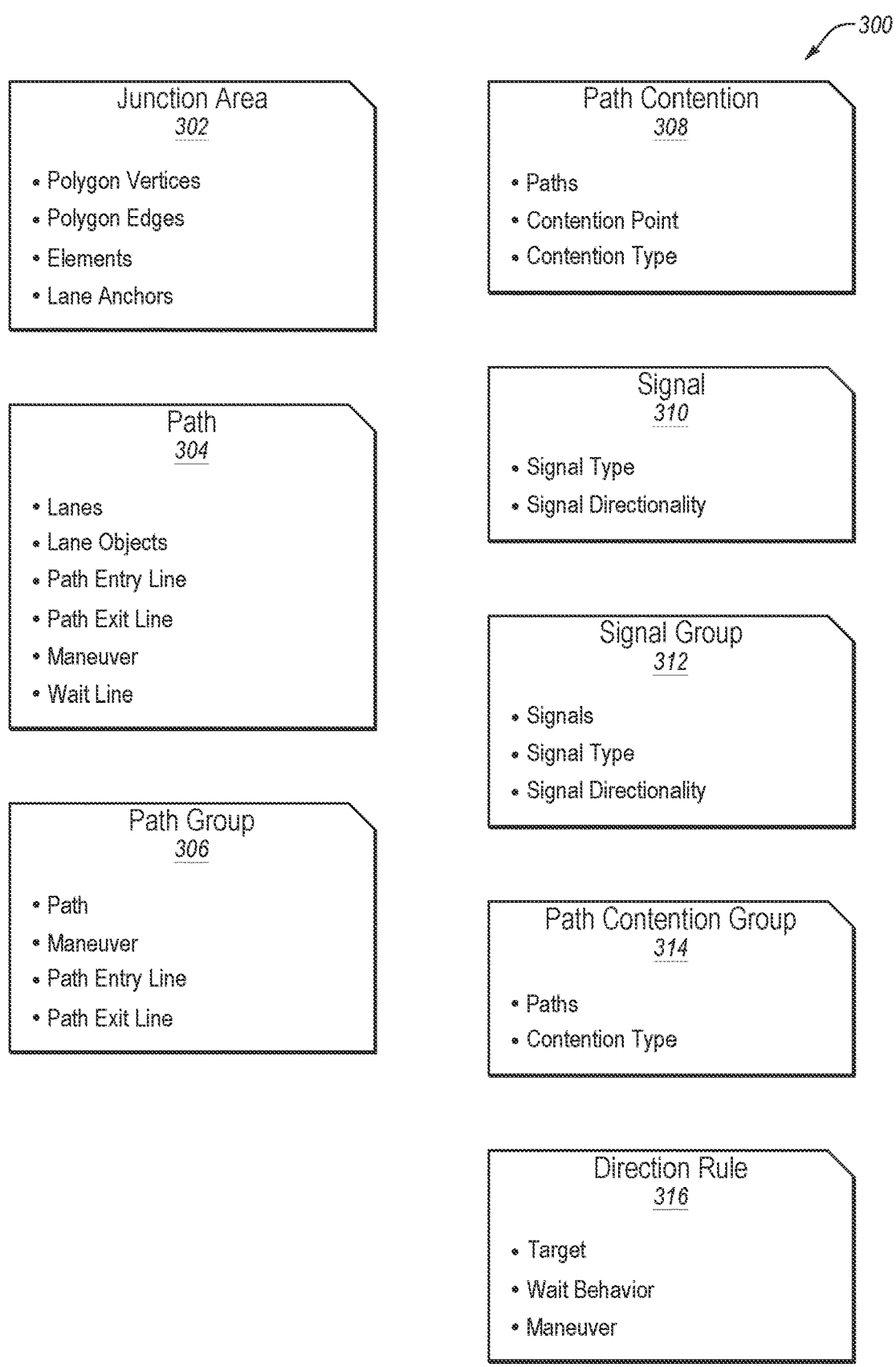
FIG. 3 illustrates data structures that may be obtained as part of generating a junction data structure, in accordance with some embodiments of the present disclosure.

FIG. 3 illustrates data structures 300 that may be obtained as part of generating a junction data structure, according to one or more embodiments of the present disclosure. The data structures 300 may include a junction area data structure 302 ("area structure 302"), a path data structure 304 ("path structure 304"), a path group data structure 306 ("path group structure 306"), a path contention data structure 308 ("path contention structure 308"), a signal data structure 310 ("signal structure 310"), a signal group data structure 312 ("signal group structure 312"), a path contention group data structure 314 ("path contention group structure 314"), and a direction rule data structure 316 ("direction rule structure 316").

The area structure 302 may generally include information that may help define a corresponding junction area, such as the junction area 206 of FIG. 2A. For example, the area structure 302 may indicate locations and/or dimensions of a bounding volume that may define the corresponding junction area. For example, in some embodiments in which a polygon is used as the bounding volume, the area structure 302 may include one or more vertex fields that include information that indicates the locations of polygon vertices of the polygon that may define the corresponding junction area. Additionally or alternatively, the area structure 302 may include one or more edge fields that include information that defines the edges of the polygon. In these or other embodiments, the edge field information may define the edges by indicating which vertices may be connected to create the respective edges.

In these or other embodiments, the area structure 302 may include one or more element fields. The element fields may include information that indicates elements that may be included in the corresponding junction area. For example, the element field information may indicate lanes, lane markers, dividers, signals, crosswalks, railroad crossings, driveways, buildings, other objects (e.g., trees, rocks, etc.), that may be located within the corresponding junction area. In these or other embodiments, the elements field information may include the locations of the elements in the corresponding junction area.

Additionally or alternatively, the area structure 302 may include one or more lane anchor fields. Lane anchors may be the entry and exit points of lanes into and out of the corresponding junction area. Therefore, in some embodiments, the lane anchor fields may include information related to locations at which the lanes of the corresponding junction area intersect with respective edges of the polygon that may define the corresponding junction area.

The path structure 304 may generally include information that may help define a corresponding path, such as a path 210 of FIG. 2A. For example, the path structure 304 may include one or more lane fields that may indicate which lanes may be part of the corresponding path. In these or other embodiments, the path structure 304 may include one or more lane object fields that may indicate objects that correspond to the lanes (e.g., lane markers, stop lines, etc.).

Additionally or alternatively, the path structure 304 may include a path entry line field. As indicated above, an entry line may include a virtual line across a lane that precedes a contention area of a corresponding junction area. A contention area may include an area at which a contending object (e.g., another vehicle, a pedestrian, a cyclist, etc.) may be in the path of a vehicle traveling in the lane. For example, a contention area may include a location of a crosswalk in the lane, an area at which the lane intersects another lane, an area at which the lane intersects a driveway, an area at which the lane intersects a railroad crossing, etc. In some embodiments, the entry lines may be respectively determined to be at a point at which the vehicle may safely stop or yield to a contending object that may be in a corresponding contention area. In these or other embodiments, the entry line may denote the beginning point of a maneuver that corresponds to the corresponding path. The entry line field may include information that indicates the location of the entry line that may be determined for the corresponding path.

In these or other embodiments, the path structure 304 may include a path exit line field. As indicated above, an exit line may include a virtual line that when passed by a vehicle denotes that a corresponding contention area has been exited (e.g., denotes the end of a maneuver). The exit line field may include information that indicates the location of the exit line that may be determined for the corresponding path.

In these or other embodiments, the path structure 304 may include a wait line field. The wait line field may include information that indicates the location of a wait line that may correspond to the corresponding path. The wait line may be a location at which a vehicle stops when performing a yielding action. The wait line may be based on where the vehicle may stop without becoming a contending object with respect to another vehicle traversing another path. In some embodiments, the wait line of a path may be the same as the entry line of the path. In these or other embodiments, the wait line may be a stop line that may be painted on a lane of the corresponding path. The wait line field may include information that indicates the respective locations of one or more wait lines that may be determined for the corresponding path.

Additionally or alternatively, the path structure 304 may include a maneuver field. The maneuver field may include information that indicates the maneuver that is performed with respect to the corresponding path.

The path group structure 306 may generally include information that may help define a corresponding path group, such as a path group 218 of FIG. 2A. For example, the path group structure 306 may include one or more path fields that may include information that indicates which paths are part of the corresponding path group. In these or other embodiments, the path fields may include the path data structures of the corresponding paths.

In these or other embodiments, the path group structure 306 may include a maneuver field. The maneuver field may include information that indicates the maneuver that is common to all the paths of the corresponding path group. Additionally or alternatively, the path group structure 306 may include a path entry line field. The path entry line field may include information that indicates the path entry line that may be common to all the paths of the corresponding path group. In these or other embodiments, the path group structure 306 may include a path exit line field. The path exit line field may include information that indicates the path exit line that may be common to all the paths of the corresponding path group.

The path contention structure 308 may generally include information that may help define a corresponding path contention, such as a path contention 213 of the contentions 214 of FIG. 2A. For example, the path contention structure 308 may include one or more path fields that may indicate which paths may be associated with the corresponding path contention and accordingly may indicate a contending semantic relationship between the paths included in the one or more path fields. In these or other embodiments, the path contention structure 308 may include a contention point field. The contention point field may include information that indicates a vicinity at which the contending paths may intersect and accordingly contend with each other. Additionally or alternatively, the path contention structure 308 may include a contention type field. The contention type field may include information that indicates the type of path contention. For example, the contention type field may include information that indicates whether the corresponding path contention is intersecting paths, merging paths, etc.

The signal structure 310 may generally include information that may help define a corresponding signal, such as a signal 215 of the contentions 214 of FIG. 2A. For example, the signal structure 310 may include a signal type field that may include information that indicates the type of signal. For example, the signal type field may include information that indicates whether the corresponding signal is a stop sign, a yield sign, a railroad crossing sign, a green light, a yellow light, a red light, a green turn arrow, a red turn arrow, a yellow turn arrow, etc.

In these or other embodiments, the signal structure 310 may include a signal directionality field that includes information that indicates a directionality of the corresponding signal. For example, in some embodiments, the signal directionality field may include information that indicates as to which edge of the corresponding junction the corresponding signal may apply. In these or other embodiments, the indication of which edge may be an indication as to a particular polygon edge of the polygon that defines the corresponding junction area.

The signal group structure 312 may generally include information that may help define a corresponding signal group, such as a signal group 221 of FIG. 2A. For example, the signal group structure 312 may include one or more signal fields that may include information that indicates which signals are part of the corresponding signal group. In these or other embodiments, the signal fields may include the signal data structures of the corresponding signals.

In these or other embodiments, the signal group structure 312 may include a signal type field. The signal type field may include information that indicates the signal type that is common to all the signals of the corresponding signal group. Additionally or alternatively, the signal group structure 306 may include a signal directionality field. The signal directionality field may include information that indicates the directionality of the signals of the corresponding signal group. In these or other embodiments, the directionality information may be similar or analogous to that used for the signal structure 310.

The path contention group structure 314 may generally include information that may help define a corresponding path contention group, such as a contention group 222 of FIG. 2A. For example, the path contention group structure 314 may include one or more path fields that may include information that indicates which paths are part of the corresponding path contention group. In these or other embodiments, the path fields may include the path data structures of the corresponding paths.

Additionally or alternatively, the path contention group structure 314 may include a contention type field. The contention type field may include information that indicates the type of path contention type that is common to all the paths of the corresponding path contention group. The contention type field information may be similar or analogous to that used for the path contention structure 308.

The direction rule structure 316 may generally include information that may help define a corresponding direction rule, such as a direction rule 230 of FIG. 2B. For example, the direction rule structure 316 may include a target field that may include information that indicates a target of the corresponding direction rule. A target of the corresponding direction rule may indicate as to which contention the corresponding direction rule applies. For example, a target may be a path contention, a signal, etc.

In these or other embodiments, the direction rule structure 316 may include one or a maneuver field. The maneuver field may include information that indicates a particular maneuver to which the corresponding direction rule may apply.

Additionally or alternatively, the direction rule structure 316 may include one or more wait behavior fields that may indicate wait behavior that may be performed with respect to the target contention and the particular maneuver. In these or other embodiments, the wait behavior information may include a core wait behavior. The core wait behavior may include the contention rules that may indicate which actions should be performed with respect to the target contention. Some example core behaviors may include an unknown behavior, a take way behavior, a stop entry behavior, a yield entry behavior, a yield contention behavior, a stopped first has precedence behavior, a negotiate behavior, a not allowed behavior, or a not allowed behavior. Additionally or alternatively, the wait behavior information may include one or more behavior modifiers that may respectively correspond to one or more of the core wait behaviors.

Unknown behavior information may indicate that the contention rules associated with the corresponding target contention and maneuver may be unknown. In these or other embodiments, the unknown behavior information may indicate that the vehicle should stop at a wait line in response to encountering a target contention with unknown contention rules.

Take way behavior information may indicate that the contention rules associated with the corresponding target contention and maneuver may be that the vehicle has the right of way. In these or other embodiments, the take way behavior information may indicate that the vehicle should expect other vehicles to yield and continue along its current trajectory. A green light signal is an example contention to which take way behavior information may be applied.

Stop entry behavior information may indicate that the contention rules associated with the corresponding target contention and maneuver may be that the vehicle stops at a wait line. In these or other embodiments, the stop entry behavior information may indicate that the vehicle is to stop at a corresponding wait line. A red light signal is an example contention to which stop entry behavior information may be applied.

Yield entry behavior information may indicate that the contention rules associated with the corresponding target contention and maneuver may be that the vehicle remains at a wait line until the path is clear. In these or other embodiments, the yield entry behavior information may include an optional behavior flag that may indicate whether the vehicle is to perform a pre-stop at the corresponding wait line before proceeding even if there is no contending object in the path. A stop sign is an example contention to which yield entry behavior information with a pre-stop indication may be applied. A yield sign is an example contention to which yield entry behavior information without a pre-stop indication may be applied.

Yield contention behavior information may indicate that the contention rules associated with the corresponding target contention and maneuver may be that the vehicle must not block a contending object's path and that the vehicle should behave as if it is appearing to yield. In these or other embodiments, yield contention behavior information may indicate that the vehicle does not have to wait at a wait line. In these or other embodiments, the yield contention behavior information may include an optional behavior flag that may indicate whether the vehicle is to perform a pre-stop before proceeding even if there is no contending object in the path. An asymmetrical path merge is an example contention to which yield contention behavior information may be applied.

Stopped first has precedence behavior information may indicate that the contention rules associated with the corresponding target contention and maneuver may be that the right of way is determined as a first-in-first out queue, in which "in" may be defined as coming close to the junction area as the first actor from that path and stopping. A four-way stop is an example contention to which stopped first has precedence behavior information may be applied.

Negotiate behavior information may indicate that the contention rules associated with the corresponding target contention and maneuver may be that there is no set basis for determining a right of way. In these or other embodiments, the negotiate behavior information may indicate that contending vehicles are to coordinate with each other with respect to how to negotiate the corresponding yield scenario. A symmetrical path merge is an example contention to which negotiate behavior information may be applied.

Modifications, additions, or omissions may be made to FIG. 3 without departing from the scope of the present disclosure. For example, the contents and/or fields of the data structures 300 may vary from that described. Further, the format of the data structures may vary according to different implementations.

Figure 4:
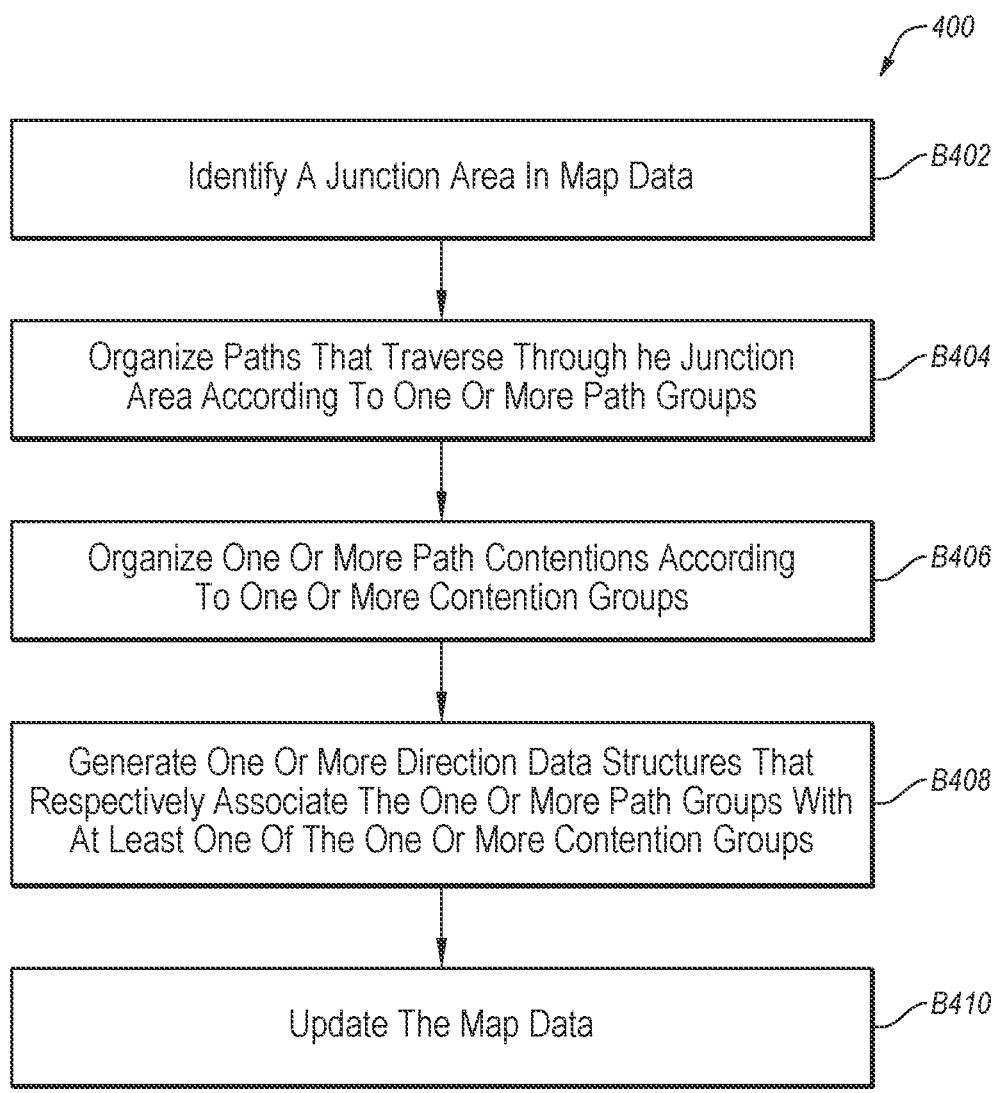
FIG. 4 is a flow diagram showing a method for generating junction data structures related to yield scenarios, in accordance with some embodiments of the present disclosure.

Now referring to FIG. 4, each block of method 400, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (stand-alone or in combination with another hosted service), or a plug-in to another product, to name a few. In addition, method 400 is described, by way of example, with respect to the junction engine 102 of FIG. 1. However, these methods may additionally or alternatively be executed by any one system, or any combination of systems, including, but not limited to, those described herein.

FIG. 4 is a flow diagram showing a method 400 for generating junction data structures related to yield scenarios, in accordance with some embodiments of the present disclosure. The method may be carried out via a junction engine, such as but not limited to the junction engine 102 of FIG. 1.

The method 400, at block B402, includes identifying, in map data of an area, a junction area. The junction area may correspond to one or more potential yield scenarios associated with vehicles passing through a corresponding geographical area that is represented by the map data. In some embodiments, the identifying of the junction area may include one or more operations described above with respect to the junction area identification 202 of FIG. 2A.

At block B404, one or more vehicle paths that traverse through the junction area may be organized according to one or more path groups. The path group organizing may be based on directionality of the vehicle paths through the junction area. In some embodiments, the organizing of the path groups may include one or more operations described above with respect to the path identification 208 and/or the path grouping 216 of FIG. 2A.

At block B406, one or more one or more contentions that influence behavior of vehicles traveling along the vehicle paths may be organized according to one or more contention groups. The contention group organizing may be based on vehicle behavior influenced by the contentions. In some embodiments, the organizing of the contention groups may include one or more operations described above with respect to the contention identification 212 and/or the contention analysis 220 of FIG. 2A.

At block B408, one or more junction direction data structures may be generated. The one or more junction direction data structures may each respectively associate a respective path group with at least one of the one or more contention groups. In some embodiments, the generation of the junction direction data structures may include one or more operations described above with respect to the junction data structure generation 224 of FIG. 2B.

At block B410, the map data that corresponds to the junction area may be updated with the one or more junction direction data structures. In some embodiments, the updating of the map data may include one or more operations described above with respect to the data update 240 of FIG. 2B.

Modifications, additions, or omissions may be made to the method 400 without departing from the scope of the present disclosure. For example, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

For example, in some embodiments, the method 400 may include one or more other operations such as updating a rule library and/or validating the junction data structures. Additionally or alternatively, the method 400 may include providing the updated map data to a control agent of a vehicle (e.g., the vehicle 500 of FIGS. 5A-5D) in which the control agent is configured to determine a yield behavior based on the updated map data.

Example Autonomous Vehicle

Figure 5A:
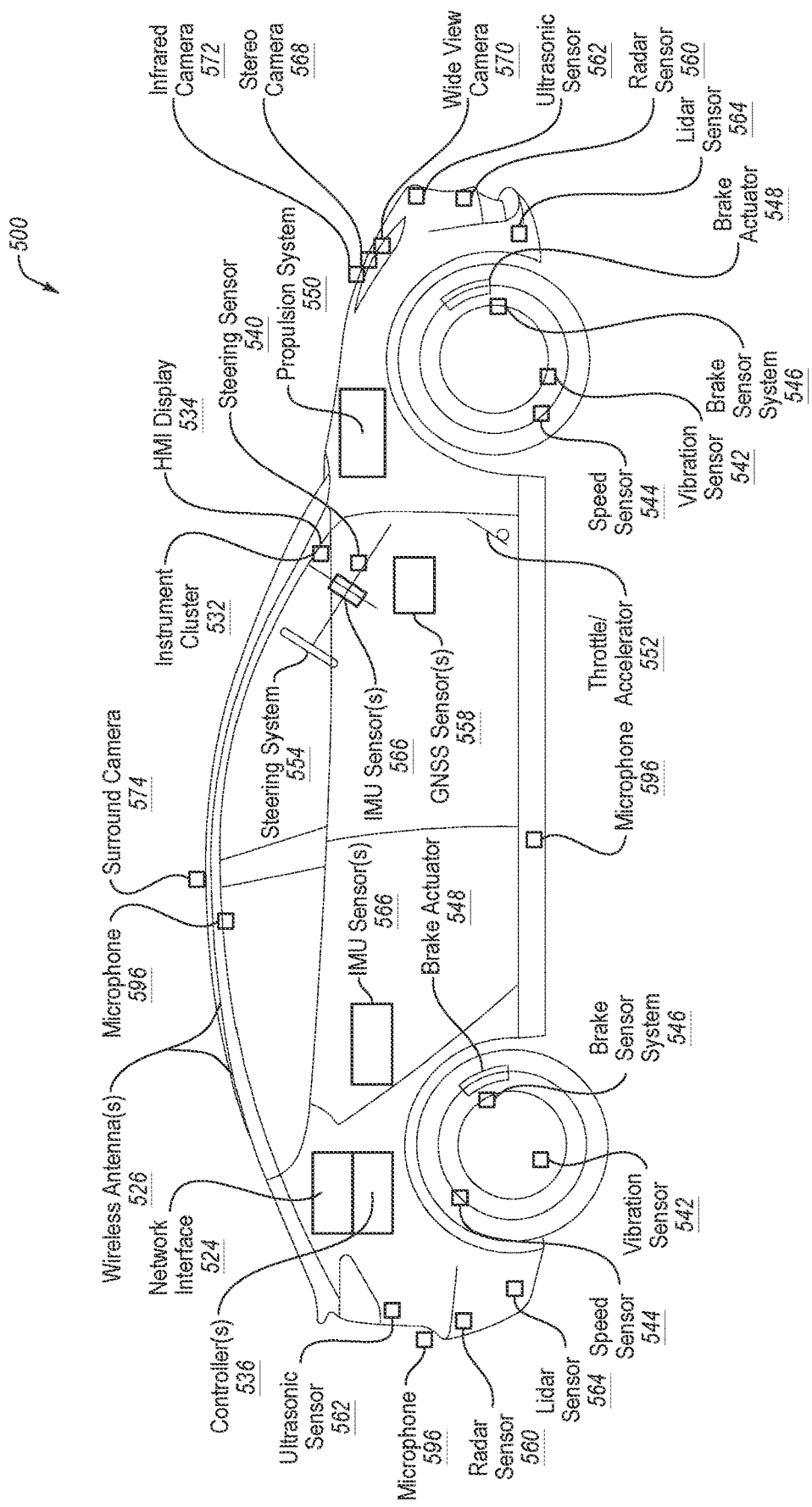
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU(s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
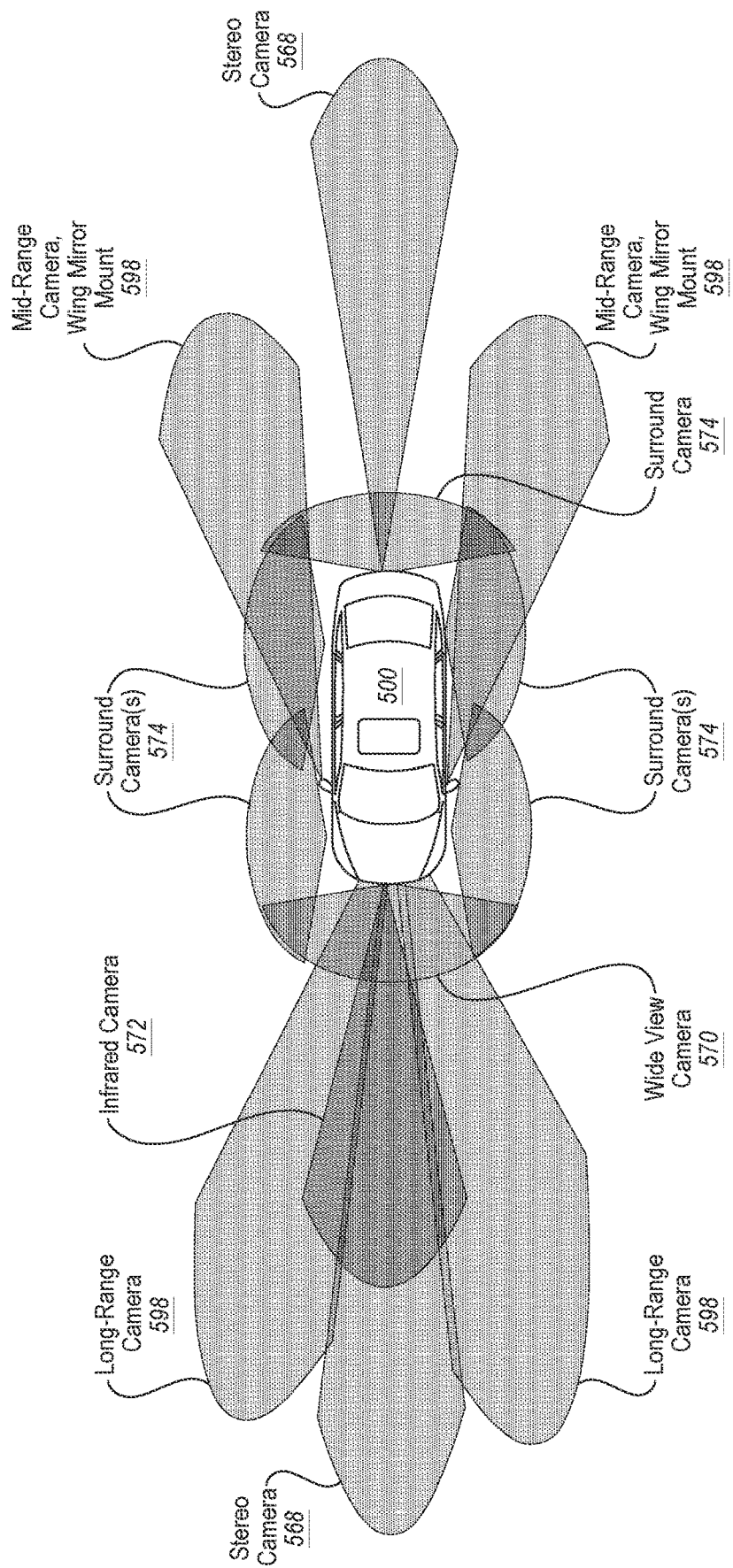
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that includes portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned around the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
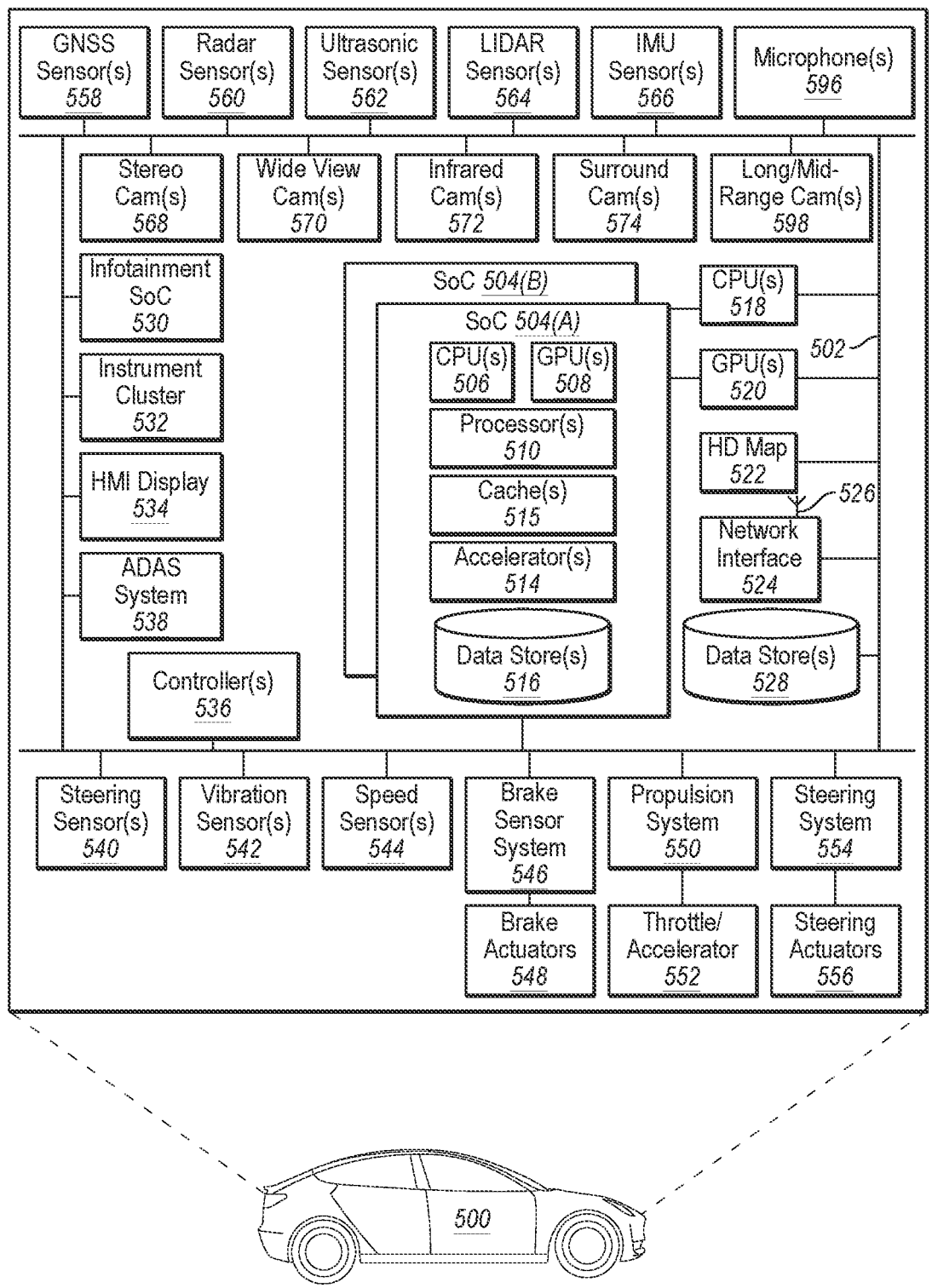
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use computer-based application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and actively performing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, which use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK).

The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include an SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 500 at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include an SoC, in some examples. The ADAS system 538 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjusts the vehicle speed to maintain a safe distance from vehicles ahead. Lateral ACC performs distance keeping, and advises the vehicle 500 to change lanes when necessary. Lateral ACC is related to other ADAS applications such as LC and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 500), while the I2V communication concept provides information about traffic farther ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
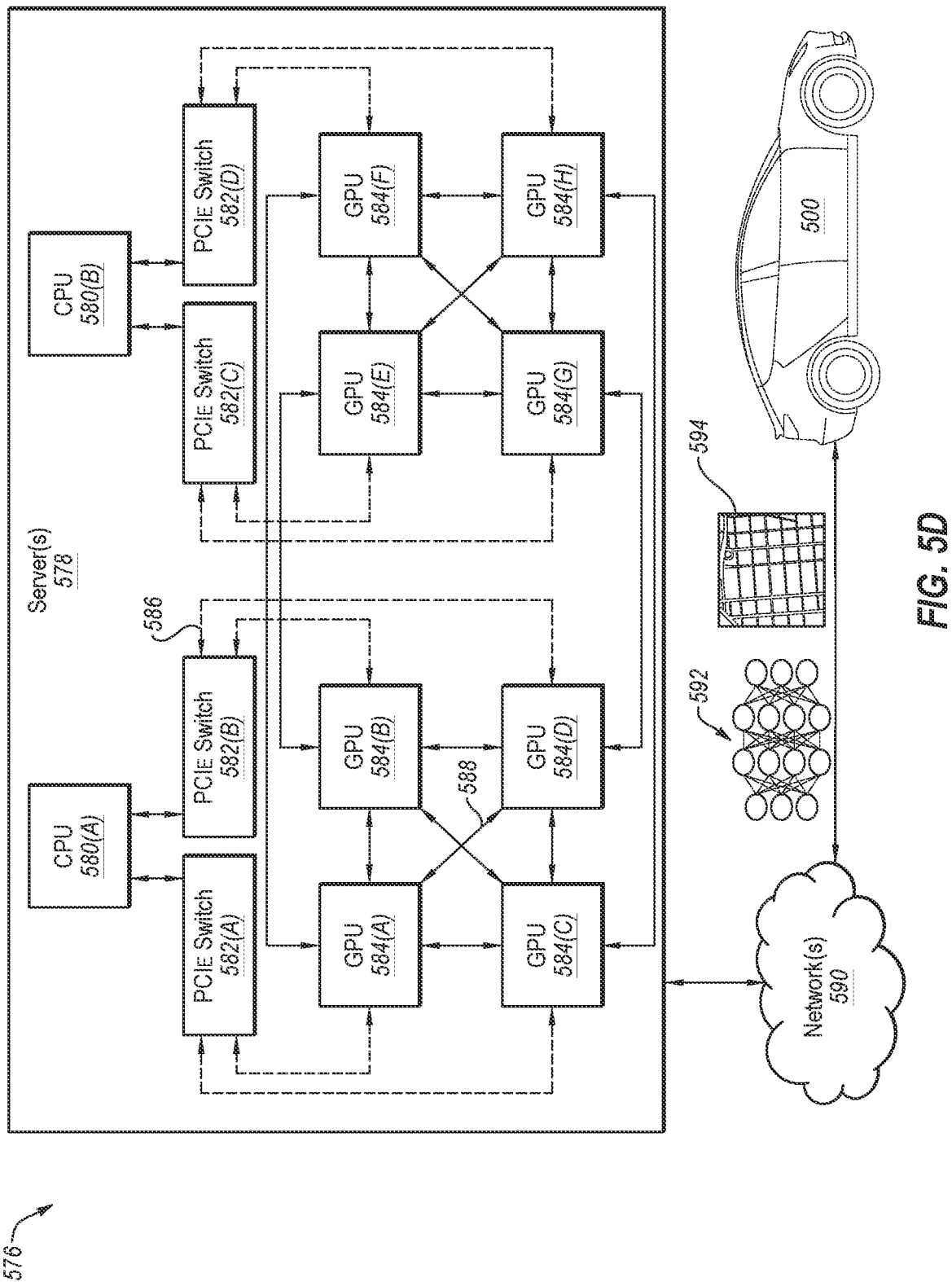
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
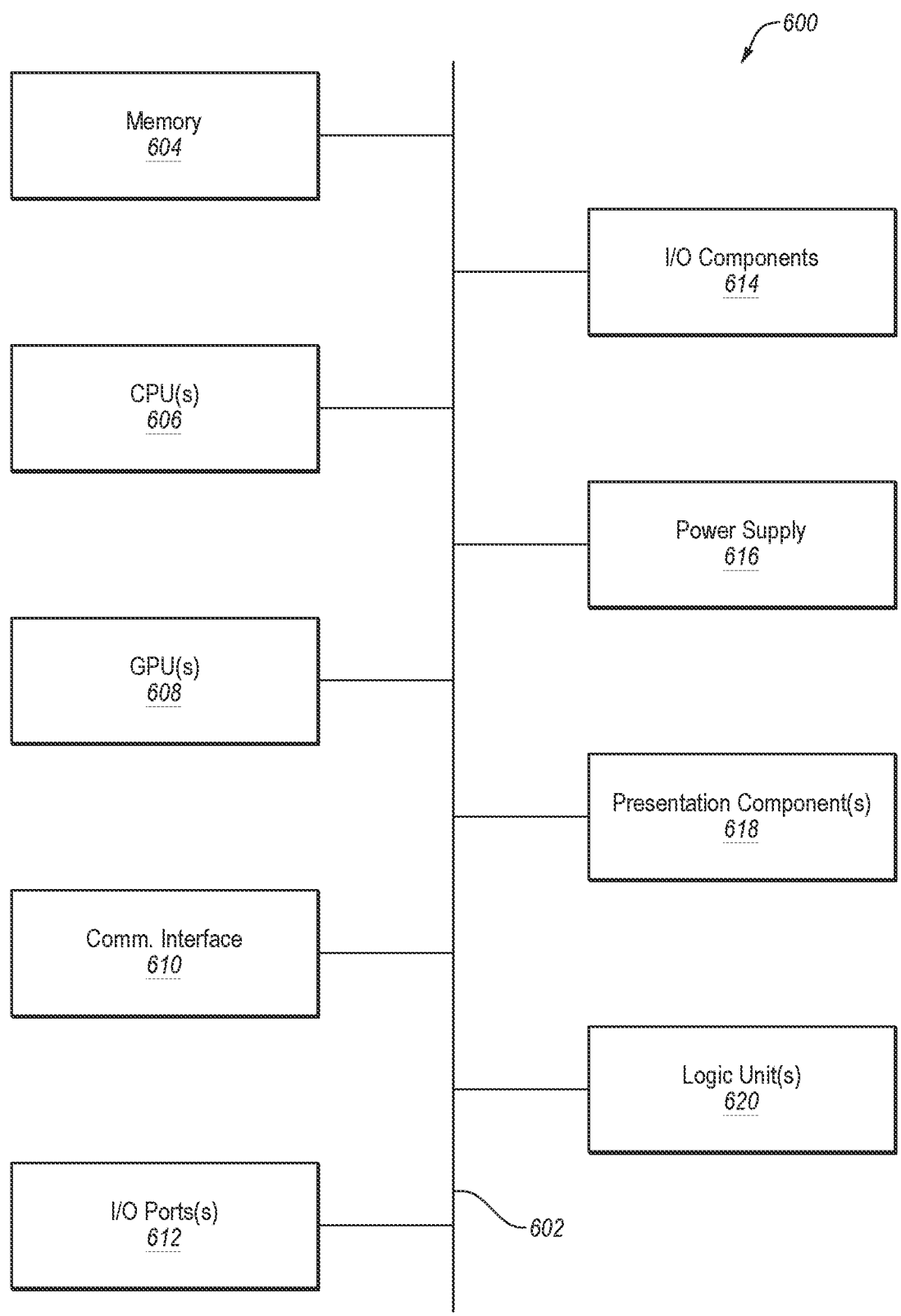
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, I/O ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, including wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built into (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
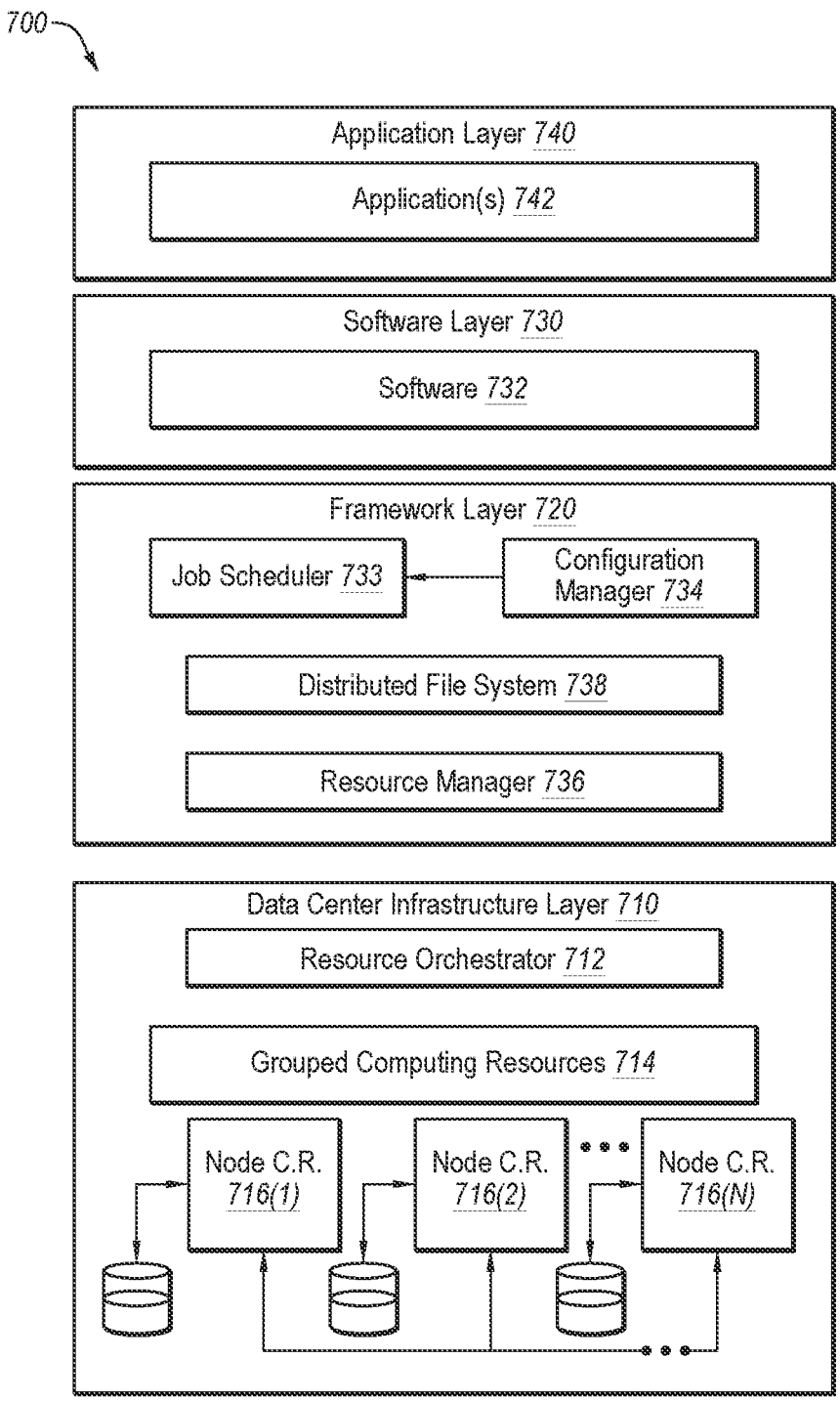
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element alone or on the second element and one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
performing, by an autonomous or semi-autonomous machine, one or more navigation, localization, or control operations for one or more of steering, braking, or accelerating the autonomous or semi-autonomous machine based at least on map data of an area that has been updated at least by:
identifying, in the map data, a junction area that corresponds to one or more potential yield scenarios associated with a corresponding geographical area represented by the map data;
organizing one or more paths that traverse through the junction area according to one or more path groups based at least on directionality of the one or more paths through the junction area;
organizing one or more contentions that influence behavior of objects traveling along the paths according to one or more contention groups based at least on object behavior influenced by the contentions;
associating, using one or more direction data structures, the one or more path groups with at least one contention group of the one or more contention groups; and
updating at least a portion of the map data that corresponds to the junction area with the one or more direction data structures.

2. The method of claim 1, further comprising obtaining one or more respective direction rules with respect to the one or more direction data structures, at least one direction rule of the one or more direction rules corresponding to a particular contention group and a particular path group of a particular direction data structure of the one or more direction data structures and defining one or more object behaviors that correspond to the particular contention group and the particular path group.

3. The method of claim 2, wherein the particular direction data structure associates the at least one direction rule with the particular contention group and the particular path group.

4. The method of claim 2, wherein:
the at least one direction rule is obtained from a rule library that indicates an association between the particular contention group and the particular path group.

5. The method of claim 1, wherein the one or more contentions include one or more of:
merging paths;
intersecting paths;
a traffic signal;
a pedestrian area;
a railroad crossing area; or
a driveway area.

6. The method of claim 1, further comprising identifying one or more of the contentions based at least on identified intersections between the paths and the one or more contentions.

7. The method of claim 1, wherein the contentions include traffic signals and organizing the contentions includes organizing the traffic signals into signal groups further based at least on directionality of the traffic signals.

8. The method of claim 1, further comprising determining a yield behavior for the machine based at least on the map data as updated.

9. One or more processors comprising:
one or more circuits to:
identify, in map data of an area, a junction area that corresponds to one or more potential yield scenarios associated with a corresponding geographical area represented by the map data;
organize one or more paths that traverse through the junction area according to one or more path groups based at least on directionality of the paths through the junction area;
organize one or more contentions that influence behavior of objects traveling along the paths according to one or more contention groups based at least on behavior influenced by the contentions;
generate one or more direction data structures that respectively associate the one or more path groups with at least one of the one or more contention groups; and
update the map data that corresponds to the junction area with the one or more direction data structures, wherein the map data as updated is used by one or more autonomous or semi-autonomous machines to perform one or more navigation, localization, or control operations for autonomous or semi-autonomous maneuvering that includes one or more of steering, braking, or accelerating the one or more autonomous or semi-autonomous machines.

10. The one or more processors of claim 9, wherein:
the one or more circuits are further to obtain one or more respective direction rules with respect to the one or more direction data structures, at least one direction rule of the one or more direction rules corresponding to a particular contention group and a particular path group of a particular direction data structure of the one or more direction data structures and defining one or more object behaviors that correspond to the particular contention group and the particular path group; and
the particular direction data structure associates the at least one direction rule with the particular contention group and the particular path group.

11. The one or more processors of claim 10, wherein:
the at least one direction rule is obtained from a rule library that indicates an association between the particular contention group and the particular path group.

12. The one or more processors of claim 9, wherein the contentions include one or more of:
merging paths;
intersecting paths;
a traffic signal;
a pedestrian area;
a railroad crossing area; or
a driveway area.

13. The one or more processors of claim 9, wherein the one or more circuits are further to identify one or more of the contentions based at least on identified intersections between the paths and the one or more contentions.

14. The one or more processors of claim 9, wherein the contentions include traffic signals and organizing the contentions includes organizing the traffic signals into signal groups further based at least on directionality of the traffic signals.

15. A system comprising:
one or more processing units to cause one or more autonomous or semi-autonomous machines to perform one or more navigation, localization, or control operations for autonomous or semi-autonomous maneuvering that includes one or more of steering, braking, or accelerating the one or more autonomous or semi-autonomous machines, the one or more navigation, localization, or control operations being based at least on map data that has been updated at least by:
- organizing one or more paths that traverse through a junction area according to one or more path groups based at least on directionality of the paths through the junction area, the junction area corresponding to one or more potential yield scenarios associated with a geographical area;
- organizing one or more contentions that influence behavior of objects traveling along the paths according to one or more contention groups based at least on path entry points and path exit points with respect to the junction area;
- obtaining one or more direction rules, at least one direction rule of the one or more direction rules corresponding to a particular contention group and a particular path group and defining one or more object behaviors that correspond to the particular contention group and the particular path group;
- generating one or more direction data structures that respectively associate two or more of: the one or more path groups, the one or more contention groups, and the one or more direction rules; and
- updating at least a portion of the map data that corresponds to the junction area with the one or more direction data structures.

16. The system of claim 15, wherein the contentions include one or more of:
merging paths;
intersecting paths;
a traffic signal;
a pedestrian area;
a railroad crossing area; or
a driveway area.

17. The system of claim 15, wherein the updating of the map data further includes identifying one or more of the contentions based at least on identified intersections between the paths and the one or more contentions.

18. The system of claim 15, wherein the contentions include traffic signals and organizing the contentions includes organizing the traffic signals into signal groups further based at least on directionality of the traffic signals.

19. The system of claim 15, wherein the one or more processing units are further to:
determine a yield behavior based at least on the map data as updated; and
perform the one or more navigation, localization, or control operations based at least on the yield behavior.

20. The system of claim 15, wherein the one or more processing units are further to define the junction area using a polygon in which the path entry points and the path exit points correspond to borders of the polygon.

* * * * *